(12) United States Patent
Huang et al.

(10) Patent No.: US 11,359,653 B2
(45) Date of Patent: Jun. 14, 2022

(54) CLAMPING DEVICE

(71) Applicant: PEGATRON CORPORATION, Taipei (TW)

(72) Inventors: Tsu-Hsuan Huang, Taipei (TW); Chun-Liang Yeh, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 43 days.

(21) Appl. No.: 17/003,701

(22) Filed: Aug. 26, 2020

(65) Prior Publication Data
US 2021/0108662 A1 Apr. 15, 2021

(30) Foreign Application Priority Data
Oct. 9, 2019 (TW) ................................. 108136754

(51) Int. Cl.
*F16B 2/10* (2006.01)
*B25B 5/14* (2006.01)
*B25B 5/04* (2006.01)
*F16B 2/00* (2006.01)
*F16B 2/18* (2006.01)

(52) U.S. Cl.
CPC .................. *F16B 2/10* (2013.01); *B25B 5/04* (2013.01); *B25B 5/14* (2013.01); *F16B 2/005* (2013.01); *F16B 2/185* (2013.01)

(58) Field of Classification Search
CPC .. F16B 2/10; F16B 2/005; F16B 2/185; B25B 5/04; B25B 5/14; B25B 5/147; F16M 13/022
See application file for complete search history.

(56) References Cited

U.S. PATENT DOCUMENTS

| | | | | |
|---|---|---|---|---|
| 3,779,108 A | * | 12/1973 | Reiter | B25B 5/068 81/424 |
| 4,673,174 A | * | 6/1987 | Tabbert | B25B 5/04 269/228 |
| 4,747,588 A | * | 5/1988 | Dillhoff | B25B 5/12 269/258 |

(Continued)

FOREIGN PATENT DOCUMENTS

| | | |
|---|---|---|
| CN | 203901128 | 10/2014 |
| CN | 206625568 | 11/2017 |

(Continued)

*Primary Examiner* — David M Upchurch
(74) *Attorney, Agent, or Firm* — J.C. Patents

(57) ABSTRACT

A clamping device includes first and second clamping components and at least one elastic component. The first and second clamping components include first and second rear portions and first and second front portions pivoted to each other respectively. The first and second rear portions are pivoted to each other. The elastic component connects the first and second clamping components. The first and second clamping components rotate, with respect to each other, to a first state due to an elastic force of the elastic component so that the first and second front portions have a first distance. When the first and second clamping components are subject to a force, the first and second clamping components resist the elastic force of the elastic component and rotate, with respect to each other, to a second state so that the first and second front portions have a second distance greater than the first distance.

9 Claims, 7 Drawing Sheets

(56) References Cited

U.S. PATENT DOCUMENTS

| | | | |
|---|---|---|---|
| 6,634,202 B1 | 10/2003 | Oetiker | |
| 6,745,441 B1 * | 6/2004 | Lin | B25B 5/06 |
| | | | 100/234 |
| 7,004,682 B1 * | 2/2006 | Moody | B25B 5/10 |
| | | | 405/184.4 |
| 7,226,047 B1 * | 6/2007 | Beauchamp | B23K 37/0533 |
| | | | 269/43 |
| 10,399,210 B1 * | 9/2019 | Rauckman | B29C 45/374 |
| 2004/0163723 A1 | 8/2004 | Taylor et al. | |
| 2013/0113150 A1 * | 5/2013 | Velez | B23K 37/0533 |
| | | | 269/156 |
| 2013/0185926 A1 * | 7/2013 | Williams | B23K 37/0435 |
| | | | 29/559 |
| 2013/0221593 A1 * | 8/2013 | Melchior | B25B 5/10 |
| | | | 269/107 |
| 2014/0003862 A1 * | 1/2014 | Shi | F41G 11/004 |
| | | | 403/322.4 |
| 2014/0299313 A1 * | 10/2014 | Messmer | E21B 19/161 |
| | | | 166/77.51 |
| 2015/0235821 A1 * | 8/2015 | Madocks | H01J 37/3435 |
| | | | 204/298.12 |
| 2020/0224685 A1 * | 7/2020 | Calhoun | G03B 17/566 |

FOREIGN PATENT DOCUMENTS

| | | |
|---|---|---|
| CN | 110178567 | 8/2019 |
| GB | 1422068 | 1/1976 |
| TW | M495925 | 2/2015 |

* cited by examiner

CLAMPING DEVICE

CROSS-REFERENCE TO RELATED APPLICATION

This application claims the priority benefit of Taiwan application no. 108136754, filed on Oct. 9, 2019. The entirety of the above-mentioned patent application is hereby incorporated by reference herein and made a part of this specification.

TECHNOLOGY FIELD

The invention relates to a clamping device, and more particular, to a clamping device capable of clamping a cylinder.

BACKGROUND

Description of the Related Art

With the development of automated manufacturing technology, various computer numerical control (CNC) tool machines have been popularized in the manufacturing industry. Some CNC tool machines are equipped with a warning lamp post for emitting warning lights when the tool machine operates abnormally. However, an operator needs to manually stop the tool machine or operate the tool machine to perform the trouble shooting after finding out that the warning light of the warning lamp post sets off, which violates the concept of automated production. If a light sensor can be stably installed on the warning lamp post, the automation of the tool machine can be improved by its sensing of the warning light.

SUMMARY

The invention provides a clamping device capable of clamping a cylinder.

A clamping device of the invention includes a first clamping component, a second clamping component and at least one elastic component. The first clamping component includes a first rear portion and a first front portion pivoted to each other. The second clamping component includes a second rear portion and a second front portion pivoted to each other. The first rear portion and the second rear portion are pivoted to each other. The at least one elastic component connects the first clamping component with the second clamping component. The first clamping component and the second clamping component are adapted to rotate, with respect to each other, to a first state due to an elastic force of the at least one elastic component so that the first front portion and the second front portion have a first distance in between, and the first clamping component and the second clamping component are adapted to rotate, with respect to each other, to a second state due to a force against the elastic force of the at least one elastic component so that the first front portion and the second front portion have a second distance greater than the first distance in between.

In an embodiment of the invention, an end of the first rear portion is pivoted on an end of the second rear portion, the other end of the first rear portion is pivoted on the first front portion, and the other end of the second rear portion is pivoted to the second front portion.

In an embodiment of the invention, the at least one elastic component includes a first elastic component, a second elastic component, and a third elastic component, wherein the first elastic component is connected between the first rear portion and the first front portion, the second elastic component is connected between the second rear portion and the second front portion, and the third elastic component is connected between the first rear portion and the second rear portion.

In an embodiment of the invention, an elastic coefficient of the third elastic component is greater than an elastic coefficient of the first elastic component and greater than an elastic coefficient of the second elastic component.

In an embodiment of the invention, the clamping device includes a first link rod and a second link rod, wherein the first link rod is pivoted on the first rear portion and the first front portion, the second link rod is pivoted on the second rear portion and the second front portion, and the first link rod and the second link rod are adapted to drive the first rear portion, the first front portion, the second rear portion and the second front portion to rotate from the first state to the second state.

In an embodiment of the invention, the first link rod has a first tongue, the second link rod has a second tongue, and the first tongue and the second tongue are subjected to a force to drive the first link rod and the second link rod.

In an embodiment of the invention, the first clamping component has a first stopping protrusion, the second clamping component has a second stopping protrusion, and the first stopping protrusion and the second stopping protrusion are adapted to stop the first link rod and the second link rod, respectively.

In an embodiment of the invention, the first stopping protrusion and the second stopping protrusion are formed at the first rear portion and the second rear portion, respectively.

In an embodiment of the invention, the first link rod and the second link rod are bent.

In an embodiment of the invention, the clamping device includes at least anti-slip component, wherein the at least one anti-slip component is disposed on at least one of the first rear portion, the first front portion, the second rear portion and the second front portion.

Based on the above, in the clamping device of the invention, the first clamping component has the first rear portion and the first front portion that can rotate with respect to each other, and the second clamping component has the second rear portion and the second front portion that can rotate with respect to each other. With relative rotations of the rear portions and the front portions, the clamping device has multiple ranges of unfolding angles to be able to firmly clamp various cylinders in different sizes.

To make the aforementioned more comprehensible, several embodiments accompanied with drawings are described in detail as follows.

DETAILED DESCRIPTION

Figure 1:
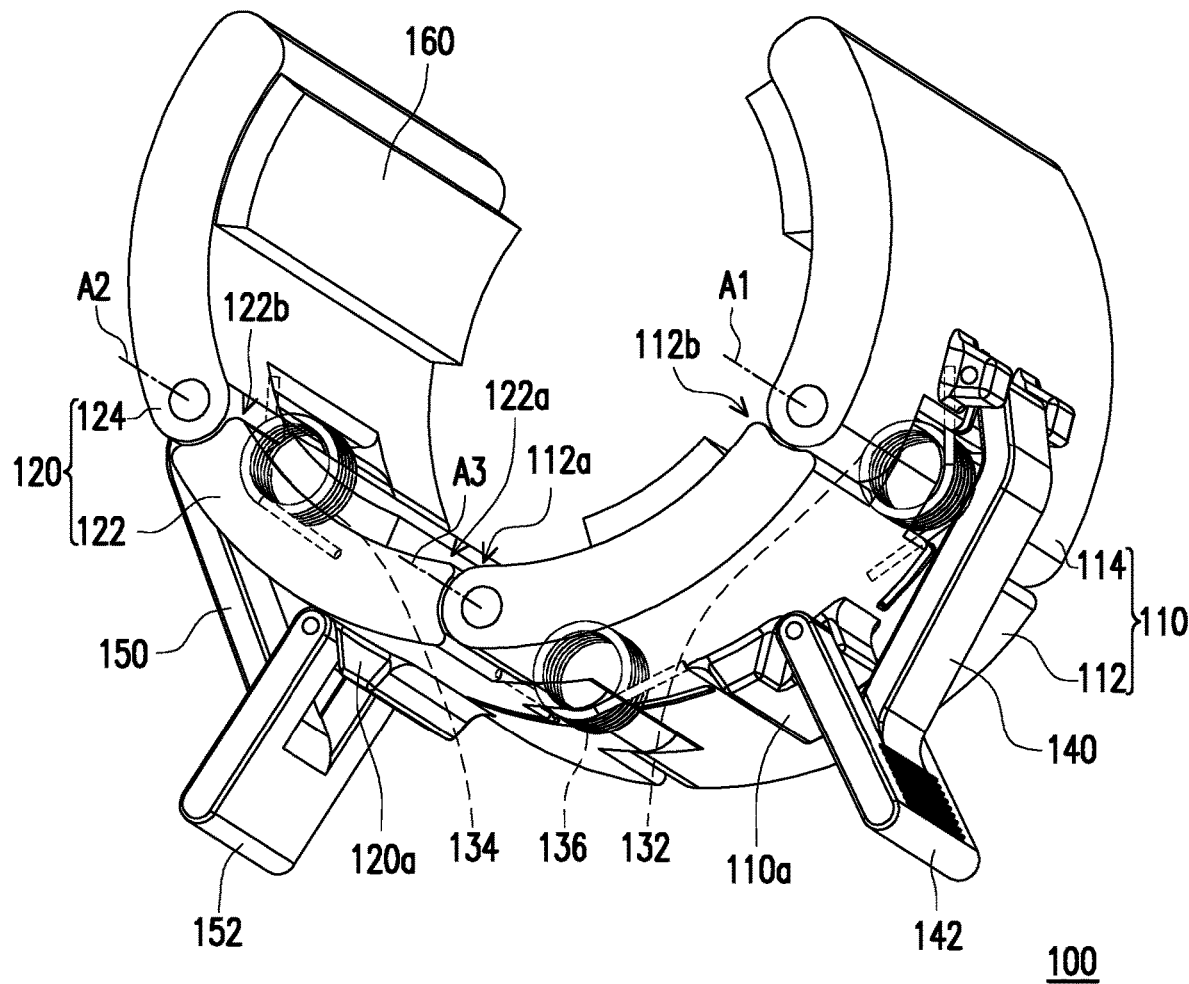
FIG. 1 is a 3D view of a clamping device according to an embodiment of the invention.

FIG. 1 is a 3D view of a clamping device according of to an embodiment of the invention. Referring to FIG. 1, a clamping device 100 of the present embodiment includes a first clamping component 110, a second clamping component 120, a first elastic component 132, a second elastic component 134, and a third elastic component 136. The first clamping component 110 includes a first rear portion 112 and a first front portion 114 pivoted to each other. The second clamping component 120 includes a second rear portion 122 and a second front portion 124 pivoted to each other. The first rear portion 112 of the first clamping component 110 and the second rear portion 122 of the second clamping component 120 are pivoted to each other. The first elastic component 132, the second elastic component 134, and the third elastic component 136 connect the first clamping component 110 with the second clamping component 120.

In this embodiment, the first rear portion 112, the first front portion 114, the second rear portion 122 and the second front portion 124 are, for example, arc-shaped structures. An end 112a of the first rear portion 112 is pivoted to an end 122a of the second rear portion 122. The other end 112b of the first rear portion 112 is pivoted to the first front portion 114. The other end 122b of the second rear portion 122 is pivoted to the second front portion 124. However, the invention is not limited in this regard. In other embodiments, the first rear portion 112, the first front portion 114, the second rear portion 122 and the second front portion 124 may have other suitable shapes and connecting methods.

Figure 2A:
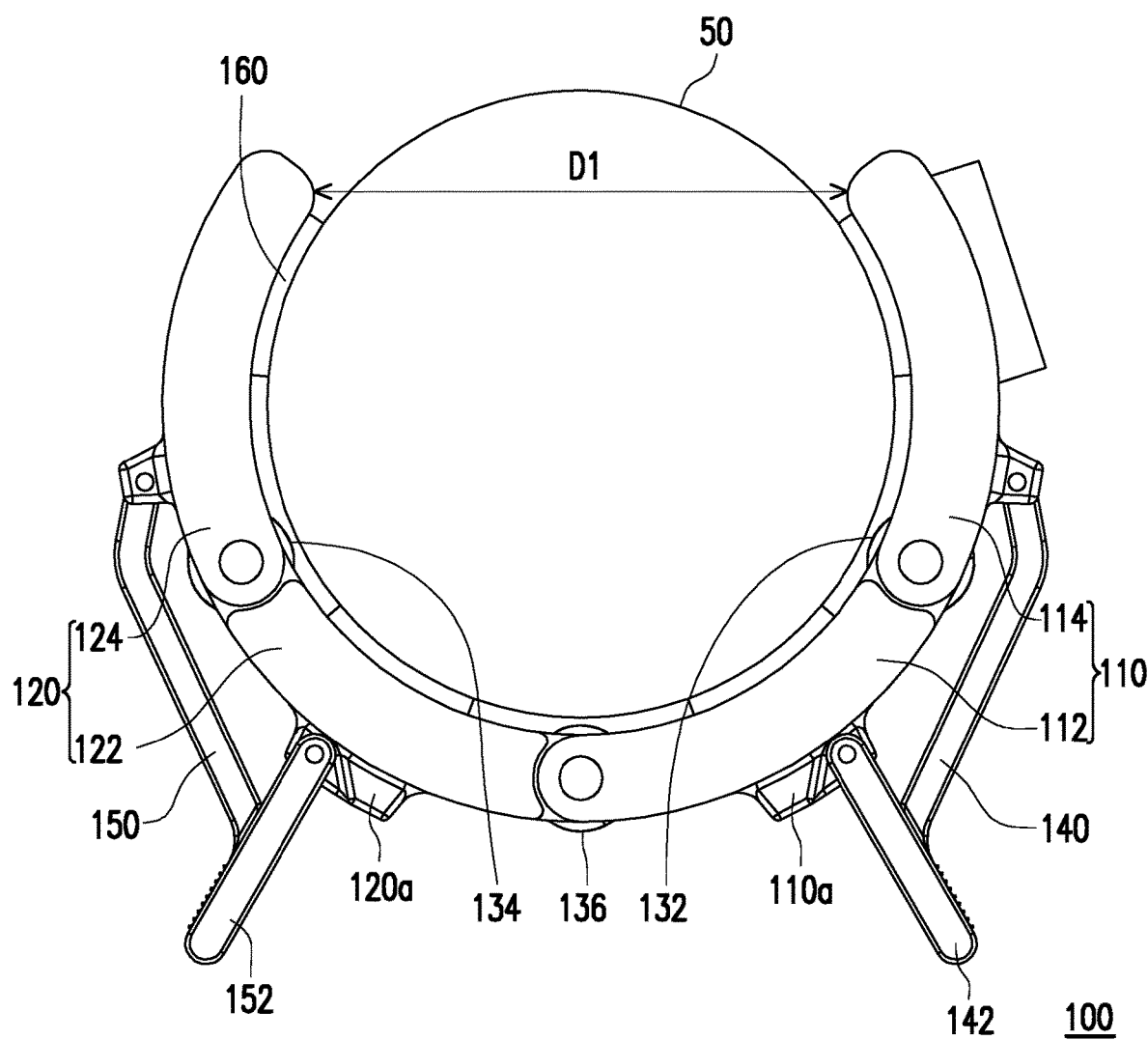
FIG. 2A and FIG. 2B illustrate the first clamping component and the second clamping component of FIG. 1 rotate with respect to each other in different states.
Figure 2B:
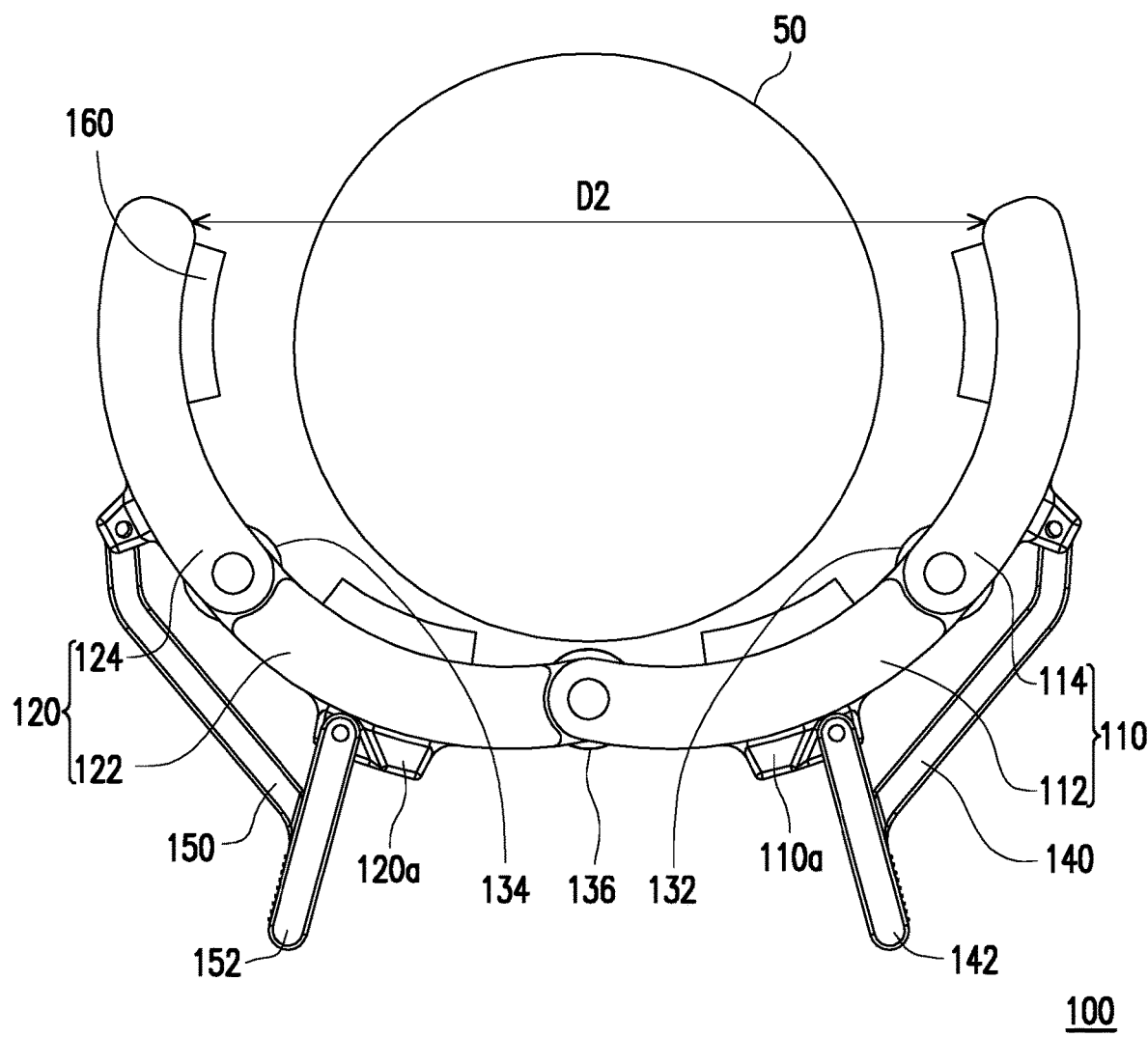

FIG. 2A and FIG. 2B illustrate the first clamping component 110 and the second clamping component 120 of FIG. 1 rotate with respect to each other in different states. The first clamping component 110 and the second clamping component 120 are adapted to rotate, with respect to each other, to a first state shown in FIG. 2A due to the elastic forces of the first elastic component 132, the second elastic component 134 and the third elastic component 136 so that the first front portion 114 of the first clamping component 110 and the second front portion 124 of the second clamping component 120 have a first distance D1 in between. The first clamping component 110 and the second clamping component 120 are adapted to resist the elastic forces of the first elastic component 132, the second elastic component 134 and the third elastic component 136 and rotate, with respect to each other, to a second state shown in FIG. 2B so that the first front portion 114 of the first clamping component 110 and the second front portion 124 of the second clamping component 120 have a second distance D2 greater than the first distance D1 in between.

Figure 3A:
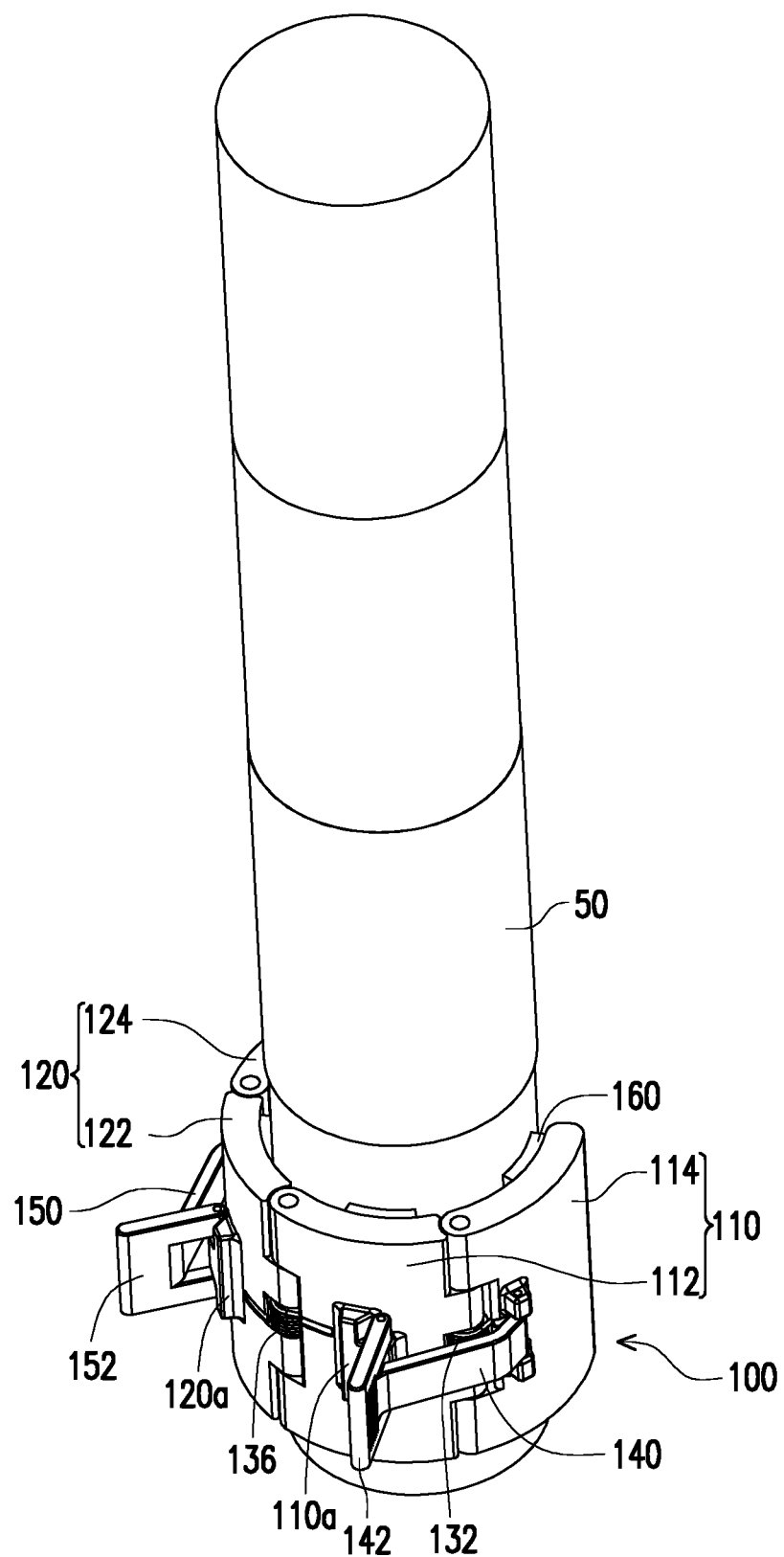
FIG. 3A and FIG. 3B illustrate the clamping device of FIG. 1 used for clamping a cylinder.
Figure 3B:
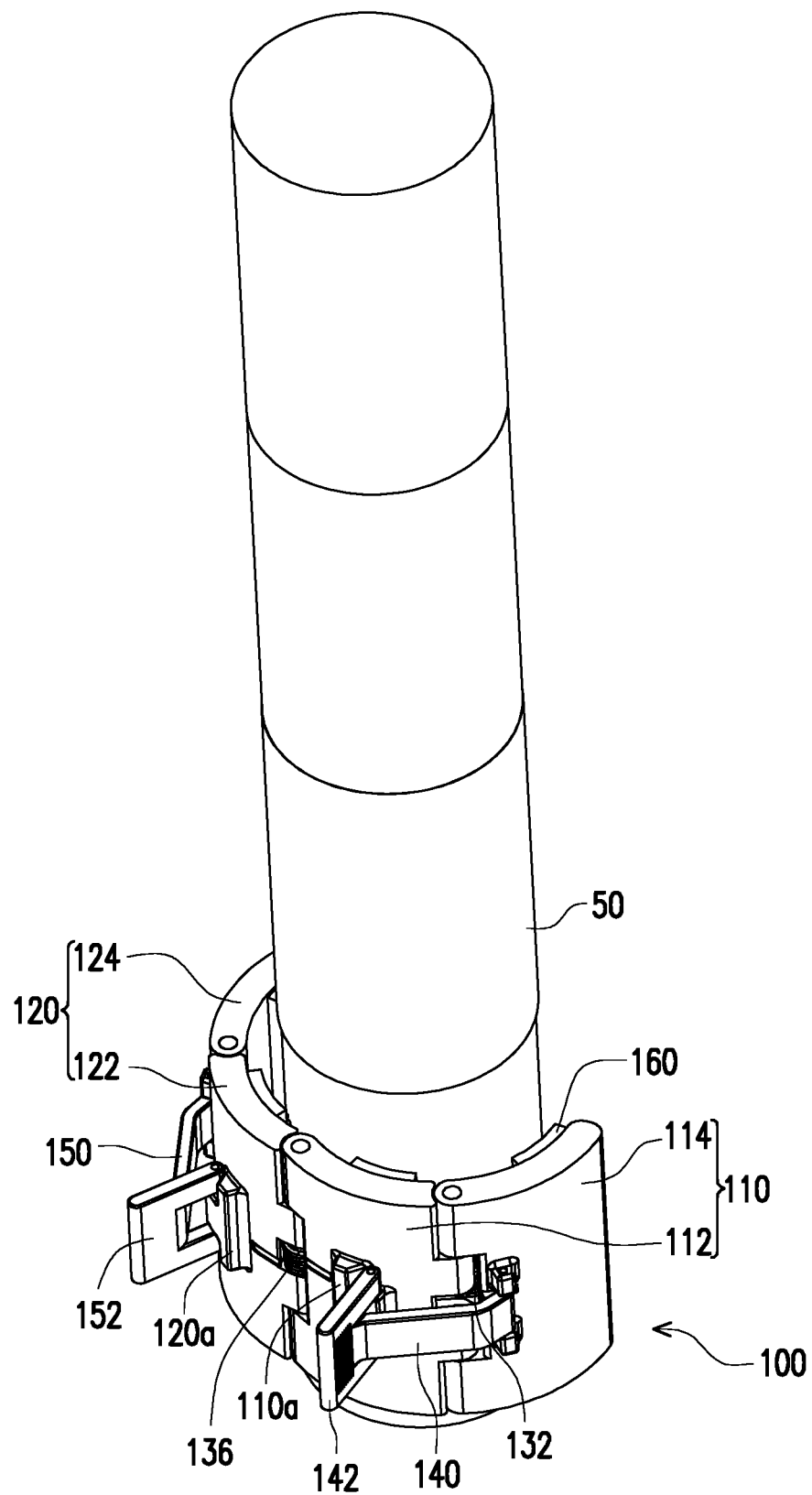

FIG. 3A and FIG. 3B illustrate the clamping device of FIG. 1 used for clamping a cylinder. When intending to use the clamping device 100 to clamp a cylinder 50 shown in FIG. 3A and FIG. 3B, a user can apply a force to the first clamping component 110 and the second clamping component 120 to resist the elastic forces of the first elastic component 132, the second elastic component 134 and the third elastic component 136 so that the first clamping component 110 and the second clamping component 120 rotate, with respect to each other, to the second state shown in FIG. 2B. Accordingly, between the first front portion 114 and the second front portion 124 exists a greater distance, the second distance D2. Therefore, the clamping device 100 can allow the cylinder 50 to pass through, as shown in FIG. 3B. Next, the user stops applying the force to the first clamping component 110 and the second clamping component 120. At this time, the first clamping component 110 and the second clamping component 120 returns to the first state shown in FIG. 2A due to the elastic forces of the first elastic component 132, the second elastic component 134 and the third elastic component 136. Accordingly, between the first front portion 114 and the second front portion 124 exists a smaller distance, the first distance D1, so that the cylinder 50 is clamped, as shown in FIG. 3A.

Figure 4:
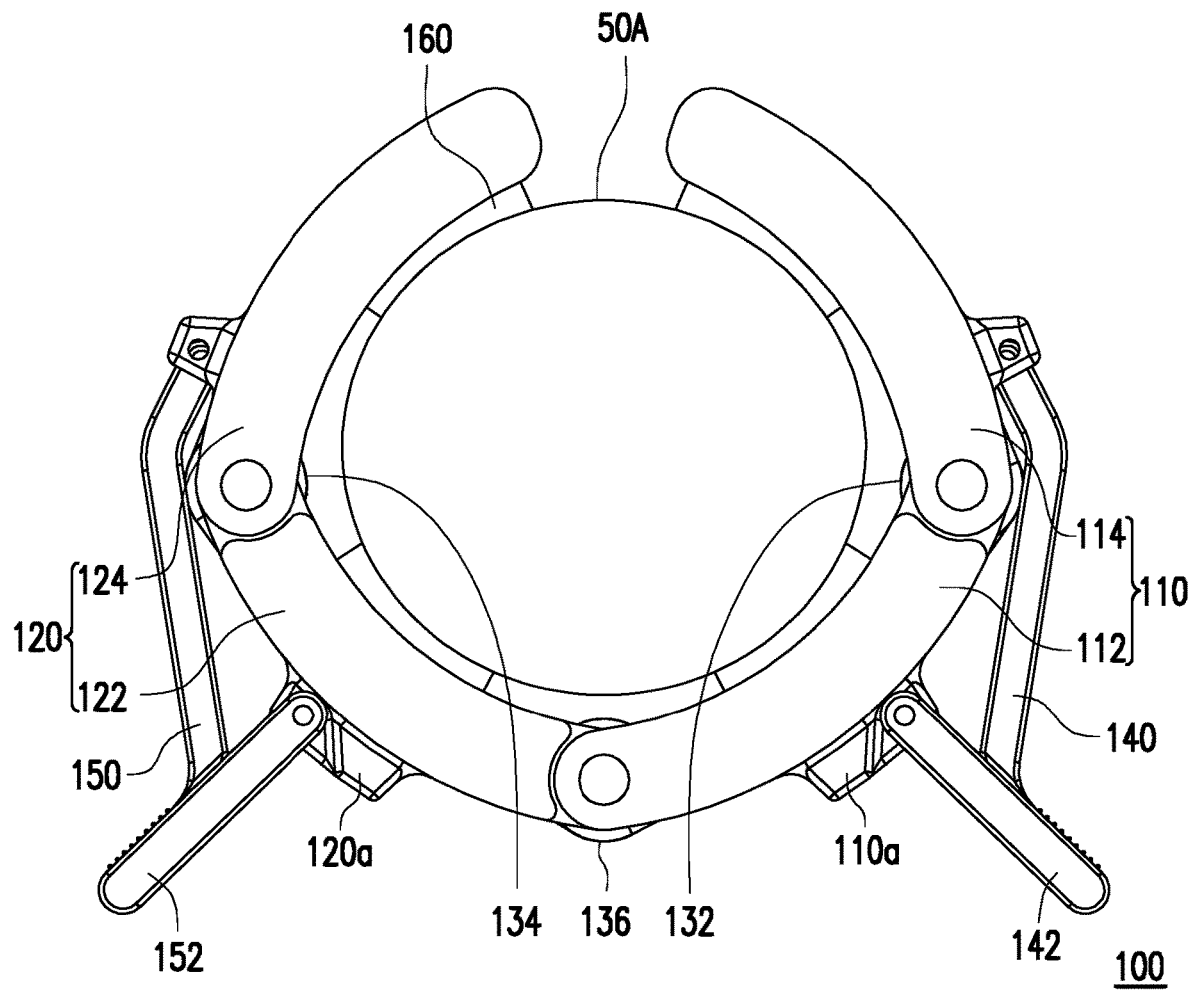
FIG. 4 illustrates the clamping device of FIG. 1 used for clamping a cylinder in a different size.

As described above, the first clamping member 110 is designed to have the first rear portion 112 and the first front portion 114 pivoted, and the second clamping member 120 is designed to have the second rear portion 122 and the second front portion 124 pivoted. With relative rotations of the rear portions and the front portions, the clamping device 100 has multiple ranges of unfolding angles to firmly clamp various cylinders in different sizes. FIG. 4 illustrates the clamping device of FIG. 1 used for clamping a cylinder in a different size. Specifically, regardless of the cylinder 50 with a larger outer diameter shown in FIG. 2A or the cylinder 50A with a smaller outer diameter shown in FIG. 4, the clamping device 100 can firmly clamp the cylinder with the multiple ranges of unfolding angles.

Figure 5:
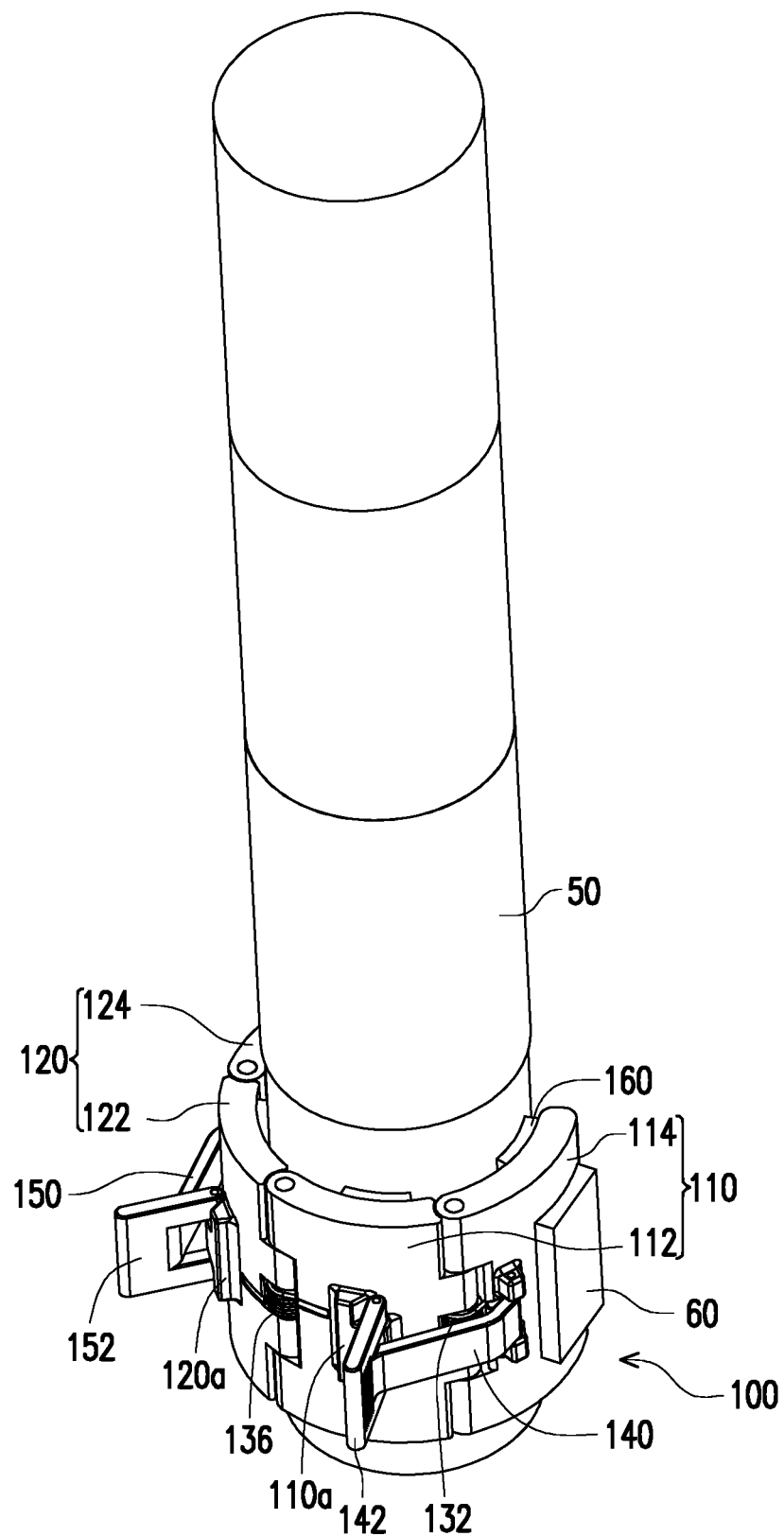
FIG. 5 illustrates a light sensor installed on the clamping device of FIG. 3A.

FIG. 5 illustrates a light sensor installed on the clamping device of FIG. 3A. For example, the cylinder 50 is a warning light post disposed on a CNC (Computer Numerical Control) tool machine to emit a warning light when the tool machine operates abnormally. The user can install a light sensor 60 on the clamping device 100 in an appropriate manner such as engaging, hanging, etc. As described above, by the clamping device 100 firmly clamping the cylinder 50, the light sensor 60 can sense the warning light emitted by the cylinder 50 and automatically transmit a sensing signal to the CNC tool machine. In this way, the CNC tool machine can automatically stop the operation of the tool machine or eliminate the abnormality.

As shown in FIG. 1, in this embodiment, a pivot axis A1 of the first rear portion 112 and the first front portion 114, a pivot axis A2 of the second rear portion 122 and the second front portion 124, a pivot axes A3 of the rear portion 112 and the second rear portion 122 are parallel to each other, for example. In addition, the first elastic member 132 is, for example, a torsion spring connected between the first rear portion 112 and the first front portion 114 at the pivot axis A1. The second elastic member 134 is, for example, a torsion spring connected between the second rear portion 122 and the second front portion 124 at the pivot axis A2. The third elastic member 136 is, for example, a torsion spring connected between the first rear portion 112 and the second rear portion 122 at the pivot axis A3.

While the first clamping member 110 and the second clamping member 120 are rotating, with respect to each other, from the first state shown in FIG. 2A to the second state shown in FIG. 2B, the first rear portion 112 and the first front portion 114 resist the elastic force of the first elastic member 132 and rotate with respect to each other; the second rear portion 122 and the second front portion 124 resist the elastic force of the second elastic member 134 and rotate with respect to each other; and the first rear portion 112 and the second rear portion 122 resist the elastic force of the third elastic member 136 and rotate with respect to each other. In addition, while the first clamping member 110 and the second clamping member 120 are rotating from the second state shown in FIG. 2B back to the first state shown in FIG. 2A with respect to each other, the first rear portion 112 and the first front portion 114 rotate with respect to each other due to the elastic force of the first elastic member 132; the second rear portion 122 and the second front portion 124 rotate with respect to each other due to the elastic force of the second elastic member 134; and the first rear portion 112 and the second rear portion 122 rotate with respect to each other due to the elastic force of the third elastic member 136.

The invention does not limit the number of components included in the first clamping member 110, and does not limit the number of components included in the second clamping member 120. For example, in other embodiments, the first rear portion 112 and the first front portion 114 may not be directly pivoted on each other. The second rear portion 122 and the second front portion 124 may not be directly pivoted on each other. One or more pivot members may be introduced between the first rear portion 112 and the first front portion 114. One or more pivot members may be introduced between the second rear portion 122 and the second front portion 124. Accordingly, the clamping device 100 can have even more ranges of unfolding angles.

The clamping device 100 of this embodiment further includes a first link rod 140 and a second link rod 150. The first link rod 140 is pivoted on the first rear portion 112 and the first front portion 114. The second link rod 150 is pivoted on the second rear portion 122 and the second front portion 124. The first link rod 140 has a first tongue 142, and the second link rod 150 has a second tongue 152. The first tongue 142 and the second tongue 152 are subjected to a force to drive the first link rod 140 and the second link rod 150, so that the first link rod 140 and the second link rod 150 drive the first rear portion 112, the first front portion 114, the second rear portion 122, and the second front portion 124 to rotate from the first state shown in FIG. 2A to the second state shown in FIG. 2B.

Through the arrangement of the first link rod 140 and the second link rod 150, the force from the user can easily drive the first rear portion 112, the first front portion 114, the second rear portion 122 and the second front portion 124 to operate. In this embodiment, the first link rod 140 and the second link rod 150 are, for example, bent, which keeps an appropriate distance between the first link rod 140 and the first clamping member 110 and an appropriate distance between the second link rod 150 and the second clamping member 120. Therefore, mutual interference between the first link rod 140 and the first clamping member 110 and mutual interference between the second link rod 150 and the second clamping member 120 may be prevented from obstructing the operation of the clamping device 100. In other embodiments, the first clamping member 110 and the second clamping member 120 may have other suitable structures for the user to apply the force to. The invention is not limited in this regard.

In this embodiment, an elastic coefficient of the third elastic member 136 at the third pivot axis A3 is, for example, greater than an elastic coefficient of the first elastic member 132 at the first pivot axis A1 and an elastic coefficient of the second elastic member 134 at the second pivot axis A2. Therefore, while the user is applying the force to the first clamping member 110 and the second clamping member 120 to unfold the first clamping member 110 and the second clamping member 120, the first front portion 114 and the second front portion 124 first open outward so that an object to be clamped can be smoothly placed between the first front portion 114 and the second front portion 124.

In addition, in this embodiment, the first clamping member 110 has a first stopping protrusion 110a, and the second clamping member 120 has a second stopping protrusion 120a. The first stopping protrusion 110a and the second stopping protrusion 120a are formed at the first rear portion 112 and the second rear portion 122, respectively, and are adapted to stop the first link rod 140 and the second link rod 150 to prevent the first clamping member 110 and the second clamping member 120 from being unfolded overly and unexpectedly. On the other hand, the clamping device 100 further includes a plurality of anti-slip components 160, The anti-slip members 160 are, for example, anti-slip mats made of rubber or other suitable materials, which are individually disposed on the first rear portion 112, the first front portion 114, the second rear portion 122, and the second front portion 124, and are configured to have a contact with the object to be clamped (e.g., the cylinder 50) and prevent the clamping device 100 from sliding relative to the object to be clamped.

In summary, according to the clamping device of the invention, the first clamping member has a first rear portion and a first front portion that can pivot with respect to each other. The second clamping member has the second rear portion and the second front portion that can pivot with respect to each other. With the relative rotations of the rear portions and the front portions, the clamping device has multiple ranges of unfolding angles, so that the cylinders of various sizes can be firmly clamped.

Although the present disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

The invention claimed is:

1. A clamping device, comprising:
a first clamping component, comprising a first rear portion and a first front portion pivoted to each other;
a second clamping component, comprising a second rear portion and a second front portion pivoted to each other, the first rear portion and the second rear portion being pivoted to each other; and
at least one elastic component, connecting the first clamping component with the second clamping component, the first clamping component and the second clamping component being adapted to rotate, with respect to each other, to a first state due to an elastic force of the at least one elastic component so that the first front portion and the second front portion have a first distance in between, and the first clamping component and the second clamping component being adapted to rotate, with respect to each other, to a second state due to a force against the elastic force of the at least one elastic component so that the first front portion and the second front portion have a second distance greater than the first distance in between,
wherein the at least one elastic component comprises a first elastic component, a second elastic component, and a third elastic component, wherein the first elastic component is connected between the first rear portion and the first front portion, the second elastic component is connected between the second rear portion and the second front portion, and the third elastic component is connected between the first rear portion and the second rear portion.

2. The clamping device of claim 1, wherein an end of the first rear portion is pivoted on an end of the second rear portion, the other end of the first rear portion is pivoted on the first front portion, and the other end of the second rear portion is pivoted to the second front portion.

3. The clamping device of claim 1, wherein an elastic coefficient of the third elastic component is greater than an elastic coefficient of the first elastic component and greater than an elastic coefficient of the second elastic component.

4. The clamping device of claim 1, further comprising: a first link rod and a second link rod, wherein the first link rod is pivoted on the first rear portion and the first front portion, the second link rod is pivoted on the second rear portion and the second front portion, and the first link rod and the second link rod are adapted to drive the first rear portion, the first front portion, the second rear portion and the second front portion to rotate from the first state to the second state.

5. The clamping device of claim 4, wherein the first link rod has a first tongue, the second link rod has a second tongue, and the first tongue and the second tongue are subjected to a force to drive the first link rod and the second link rod.

6. The clamping device of claim 4, wherein the first clamping component has a first stopping protrusion, the second clamping component has a second stopping protrusion, and the first stopping protrusion and the second stopping protrusion are adapted to stop the first link rod and the second link rod, respectively.

7. The clamping device of claim 6, wherein the first stopping protrusion and the second stopping protrusion are formed at the first rear portion and the second rear portion, respectively.

8. The clamping device of claim 4, wherein the first link rod and the second link rod are bent.

9. The clamping device of claim 1, further comprising: at least anti-slip component, wherein the at least one anti-slip component is disposed on at least one of the first rear portion, the first front portion, the second rear portion, and the second front portion.

* * * * *